US010247632B2

(12) United States Patent
Jones et al.

(10) Patent No.: US 10,247,632 B2
(45) Date of Patent: Apr. 2, 2019

(54) OIL FILLED GAGE REFERENCE SIDE PROTECTION

(71) Applicant: Honeywell International Inc., Morris Plains, NJ (US)

(72) Inventors: Ryan Jones, Dublin, OH (US); Alistair David Bradley, Hilliard, OH (US); Todd Eckhardt, Westerville, OH (US)

(73) Assignee: Honeywell International, Morris Plains, NJ (US)

( * ) Notice: Subject to any disclaimer, the term of this patent is extended or adjusted under 35 U.S.C. 154(b) by 16 days.

(21) Appl. No.: 15/191,074

(22) Filed: Jun. 23, 2016

(65) Prior Publication Data

US 2017/0370795 A1    Dec. 28, 2017

(51) Int. Cl.
*G01L 19/14*    (2006.01)
(52) U.S. Cl.
CPC .................... *G01L 19/147* (2013.01)
(58) Field of Classification Search
CPC ...................................................... G01L 19/147
See application file for complete search history.

(56) References Cited

U.S. PATENT DOCUMENTS

| 4,072,058 | A | * | 2/1978 | Whitehead, Jr. ...... G01L 9/0054 73/706 |
| 4,686,764 | A | * | 8/1987 | Adams ................ G01L 19/0645 156/303.1 |
| 4,776,218 | A | * | 10/1988 | Sawa .................... G01L 13/025 338/4 |
| 6,543,291 | B1 | * | 4/2003 | Kurtz .................... G01L 13/025 73/716 |
| 6,871,546 | B2 |   | 3/2005 | Scheurich et al. |
| 7,311,007 | B2 | * | 12/2007 | Vogler ................ G01L 19/0084 257/682 |
| 7,775,119 | B1 |   | 8/2010 | Suminto et al. |

(Continued)

FOREIGN PATENT DOCUMENTS

DE    102008019054 A1 * 11/2009 ......... G01L 19/0046

OTHER PUBLICATIONS

Bemis, et al., "The Effect of Silicon Fatigue on Kulite Silicon Pressure Sensor's Reliability", Kulite Semiconductor Products, Inc., Mar. 20, 2012, 6 pgs.

*Primary Examiner* — Lisa M Caputo
*Assistant Examiner* — Jamel E Williams
(74) *Attorney, Agent, or Firm* — Seager, Tufte & Wickhem LLP

(57) ABSTRACT

A pressure sensor can include a housing having a sense side cavity formed on a first side of the housing; a sense side diaphragm attached to the first side and over the sense side cavity, a sense die assembly placed in the cavity and attached to the housing; a reference side cavity formed in the housing, a reference side diaphragm attached to a second side of the housing and over the reference side cavity, and pin(s) electrically connected to the sense die assembly and extending outside the housing from the second side. The cavities are filled with oil. Manufacturing the pressure sensor can include mounting the sense die assembly onto the housing, attaching the sense side diaphragm to the first side of the housing, filling the cavities with oil, and attaching the reference side diaphragm on the second side of the housing and over the reference side cavity.

20 Claims, 4 Drawing Sheets

(56) References Cited

U.S. PATENT DOCUMENTS

| | | | | |
|---|---|---|---|---|
| 8,191,424 B2* | 6/2012 | Kurtz | ............... | G01L 13/025 |
| | | | | 73/721 |
| 8,297,124 B2* | 10/2012 | Watanabe | ............ | G01L 9/0022 |
| | | | | 73/715 |
| 8,567,256 B2* | 10/2013 | Albicker | ............. | G01L 19/147 |
| | | | | 73/700 |
| 2009/0183941 A1* | 7/2009 | Pabon | ............... | G01V 1/523 |
| | | | | 181/102 |
| 2012/0042734 A1* | 2/2012 | Wade | ............ | G01L 9/0052 |
| | | | | 73/862.381 |
| 2012/0174682 A1* | 7/2012 | Rozgo | ............. | G01L 19/0007 |
| | | | | 73/727 |

\* cited by examiner

OIL FILLED GAGE REFERENCE SIDE PROTECTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to gauge pressure sensors and methods for manufacturing and operation thereof.

BACKGROUND

Oil-filled gauge (gage) pressure sensors sense a pressure on a sensing side of the sensor, while a reference side of the sensor is exposed to the atmosphere (e.g., air). In such sensors, at least part of the sense die assembly contained within the oil-filled pressure sensor is exposed to atmospheric pressure, in order to measure the gauge pressure of the pressure acting on the sensing side of the sensors. There is an ongoing need to improve the performance of these oil-fill gauge pressure sensors.

SUMMARY

Disclosed herein is a pressure sensor comprising a housing having a sense side cavity formed on a first side of the housing; a sense side diaphragm attached to the first side of the housing and over the sense side cavity; a sense die assembly placed in the cavity and attached to the housing, wherein the sense die assembly comprises a sense die having a front side exposed to at least a portion of the sense side cavity; a reference side cavity formed in the housing, wherein a back side of the sense die of the sense die assembly is exposed to the reference side cavity; a reference side diaphragm attached to a second side of the housing and over the reference side cavity; and one or more pins electrically connected to the sense die assembly and extending outside the housing from the second side, wherein the sense side cavity and the reference side cavity are filled with oil.

Also disclosed herein is a method of manufacturing a pressure sensor, the method comprising mounting a sense die assembly onto a housing such that a front side of a sense die of the sense die assembly is exposed to a sense side cavity formed in a first side of the housing, and a back side of the sense die of the sense die assembly is exposed to a reference side cavity formed in a second side of the housing and such that the sense die assembly is electrically connected to one or more pins which extend outside the housing from the second side; attaching a sense side diaphragm to the first side of the housing; filling the sense side cavity and the reference side cavity with oil; and attaching a reference side diaphragm on the second side of the housing and over the reference side cavity.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed sensors and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

"Cavity" as used herein refers to a portion of the disclosed pressure sensors which contains oil.

"Atmosphere" or "atmospheric" as used herein refers to pressure conditions existing in a location without modification. For example, the atmosphere in a typical room or an outside space at sea level has an atmospheric pressure of 1 atmosphere, about 1 bar, 14.7 psi, or about 101 kPa.

It has been found that oil-filled gauge (gage) pressure sensors which have the back side of the sense die assembly exposed to the atmosphere can be susceptible to humidity in the atmosphere which can cause shifting of the output signals of the sense die. For example humidity can cause swelling in the die attach of the sense die assembly or have a direct effect upon the sense die itself such as causing instability in anodic bonds. It is also possible for humidity or air from the atmosphere on the reference side of these oil-filled gauge pressure sensors to penetrate the die attach and reach the oil-filled cavity of the sensor on the front side of the sense die assembly. Penetration of humidity (water) or air into the main oil-filled cavity can cause shifting of the product output as a result of the changes this can cause to mechanical properties of the oil and the internal oil pressure.

Disclosed herein are gauge (gage) pressure sensors which have back side seals (e.g., including the reference side diaphragms discussed below) which allow for atmospheric pressure to act on the back side of the pressure sensors while isolating the sensing components from environmental effects, such as degradation due to humidity and passing of air into the sensing side of the sensors which can cause drift.

Figure 1:
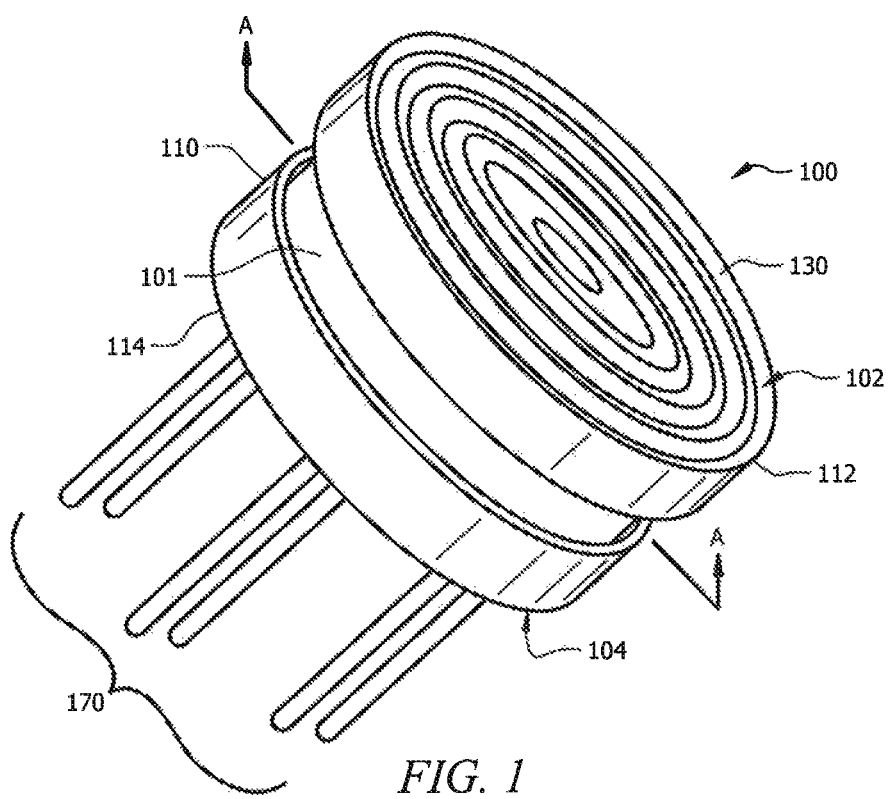
FIG. 1 illustrates a perspective view of the pressure sensor according to the disclosure.

FIG. 1 illustrates a perspective view of the pressure sensor 100 disclosed herein. The pressure sensor 100 has a front side 102, also referred to the sensing side, and a back side 104, also referred to as the reference side. The front side 102 is opposite the back side 104. The front side 102 of the sensor 100 can be exposed to a media being sensed for pressure, e.g., the media being any liquid, gas, solid, or combinations thereof. The back side 104 of the pressure sensor 100 can be connected to electrical measurement equipment and can be exposed to the atmosphere. The back side 104 is not exposed to media; thus, the pressure sensor 100 generally is configured to function as a gauge (gage) pressure sensor for determining the pressure of one or more media only on the front side 102 of the pressure sensor 100.

FIG. 1 shows the pressure sensor 100 can have a housing 110, a sense side. diaphragm 130, and pins 170. The sense side diaphragm 130 can be placed on the front side 102 of the sensor 100, and can attach to the first side 112 of the housing 110. The pins 170 can be seen on the back side 104 of the pressure sensor 100 extending outside the second side 114 of the housing 110 (e.g., extending outwardly from the second side 114 of the housing 110, the second side 114 being a side opposite the first side 112). The housing 110 is shown as having a cylindrical shape with a groove 101 between the first side 112 and the second side 114 in FIG. 1 (as well as the other figures); however, it is contemplated that the shape of the housing 110 is not limited to a cylindrical shape, nor is it limited to having a groove 101, and can have any other shape (with or without a groove 101, or with more than one groove 101) suitable for gauge pressure sensors.

Figure 2:
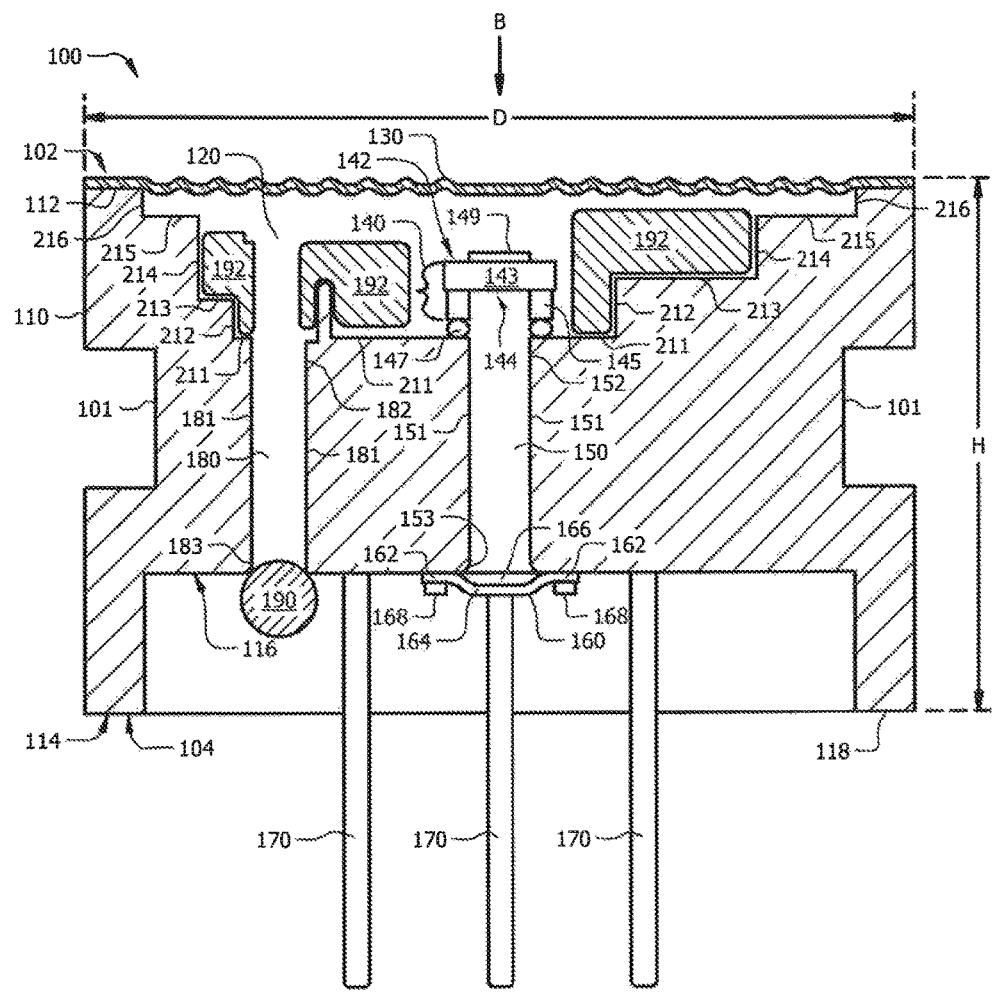
FIG. 2 illustrates a cross-section view of the pressure sensor of FIG. 1, taken along sight line A-A, and having a first configuration for the reference side diaphragm.
Figure 3:
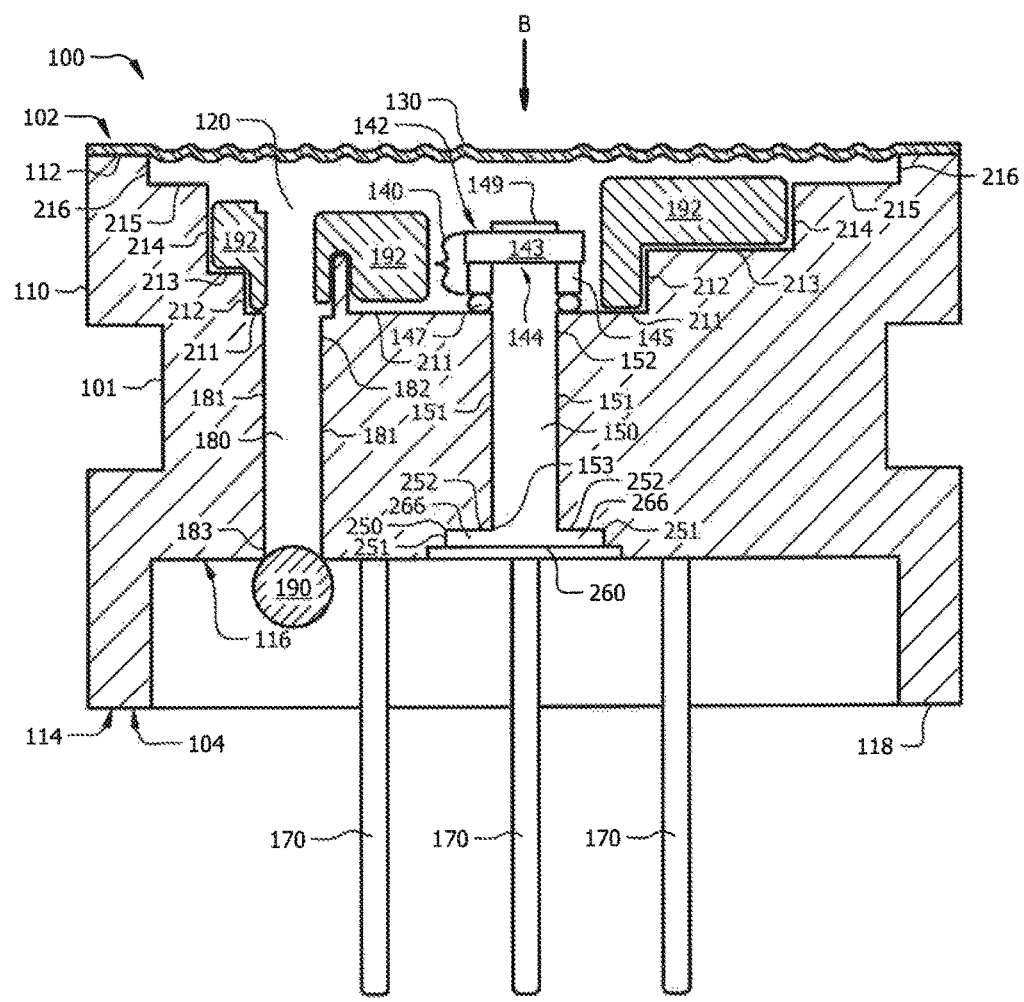
FIG. 3 illustrates a cross-section view of the pressure sensor of FIG. 1, taken along sight line A-A, and having a second configuration for the reference side diaphragm.

FIGS. 2 and 3 illustrate a cross-section view of the pressure sensor 100 of FIG. 1, taken along sight line A-A. The following discussion applies to both FIGS. 2 and 3, and features unique to FIG. 2 or unique to FIG. 3 are also discussed with reference to the applicable figure.

FIGS. 2 and 3 show the pressure sensor 100 can include the components shown in FIG. 1 (the housing 110, the sense side diaphragm 130, and the pins 170) as well as a sense side cavity 120, a sense die assembly 140, a reference side cavity 150, a reference side diaphragm 160 or 260, a fill channel 180, a seal 190, and one or more filler elements 192. FIG. 3 shows the pressure sensor 100 additionally can have a recessed portion 250 for the reference side diaphragm 260.

The housing 110 is generally a solid piece of material which can be formed (e.g., machined, molded, extruded) to include the sense side cavity 120, the reference side cavity 150, and the fill channel 1.80. With all other components of the pressure sensor 100 removed, the sense side cavity 120, the reference side cavity 150, and the fill channel 180 can form a continuous hollow space in the housing 110.

The housing 110 can be formed such that the second side 114 is contoured. FIGS. 2 and 3 also show the housing 110 can include a recessed surface 116. Alternatively, it is contemplated that the second side 114 of the housing 110 can be of any other contour, including flat.

The housing 110 can be made of any material suitable for a pressure sensor 100 of the type disclosed herein. For example, the housing 110 can be made of a metal, such as stainless steel (e.g., a 316 stainless steel). Alternatively, the housing 110 can be made of other materials (e.g., molded or extruded polymer).

In an aspect, the dimensions of the housing 110 shown in the figures can include a diameter D of about 19 mm and a height H in a range of about 9 mm to about 15 mm. However, dimensions can vary from application to application, and it is contemplated that these particular dimensions and any relative value of the diameter D to the height H of the pressure sensor 100 is not to be limited to the values disclosed herein.

The groove 101 in the housing 110 can receive an O-ring. An example of an O-ring suitable for use with the groove 101 is an AS568-016 O-ring made f any material known in the art which is suitable for a particular application with the pressure sensor 100. The O-ring can provide a seal for the pressure sensor 100 in a fitting or port in which the pressure sensor 100 is placed in order to sense a media on the sensing side 102 of the pressure sensor 100.

The housing 110 in FIG. 3 is the same configuration as shown for FIG. 2, except the housing 110 in FIG. 3 includes a recessed portion 250 formed on the second side 114 of the housing 110. The recessed portion 250 is defined by one or more walls 251 and 252 which can provide a space 266 between the reference side diaphragm 260 and the second side 114 of the housing 110. In such configurations, the reference side diaphragm 260 can extend over the recessed portion 250 and the reference side cavity 150 such that the space 266 is present between the recessed portion 250 (e.g., formed in the second side 114 of the housing 110, and in FIG. 3, formed in the recessed surface 116 of the second side 114 of the housing 110) and the reference side diaphragm 260, The recessed portion 250 can have a diameter about the same size as or smaller than the reference side diaphragm 260.

The sense side cavity 120 can be formed on the first side 112 of the housing 110. While the sense side cavity 120 is shown in FIGS. 2 and 3 having walls 211, 212, 213, 214, 215, and 216 in a particular configuration forming three stair-like levels, the configuration of the sense side cavity 1.20 is not limited to that shown in the figures and can be any configuration suitable for housing the sense die assembly 140, oil, and any filler elements 192.

The reference side cavity 150 can be formed in the housing 110 between the sense side cavity 120 and the second side 114 of the housing 110. The reference side cavity 150 has an end 152 opening to the back side 144 of the sense die 143 and an opposite end 153 opening to the second side 114 of the housing 110. In an aspect, the reference side cavity 150 can be formed to have the same dimensions and by the same techniques as a vent hole in a typical gauge pressure sensor. The reference side cavity 150 in FIGS. 2 and 3 is shown as a hole formed by drilling the hole in the housing 110. It is contemplated that the reference side cavity 150 is formed in the housing 110 before mounting of the sense die assembly 140 into the pressure sensor 100. Thus, before placement of the sense die assembly 140 into the sense side cavity 120, the end 152 of the reference side cavity 150 can open to the sense side cavity 120, and the opposite end 153 of the reference side cavity 150 can open to the second side 114 of the housing 110.

The reference side cavity 150 can have a cylindrical shape defined by wall 151. In an aspect, the reference side cavity 150 can have a diameter which is less than or substantially less than a diameter of the sense side cavity 120. "Substantially less than" in this context can mean the diameter of the reference side cavity 150 can be less than $\frac{1}{2}$, $\frac{1}{3}$, $\frac{1}{4}$, $\frac{1}{5}$, $\frac{1}{6}$, $\frac{1}{7}$, $\frac{1}{8}$, $\frac{1}{9}$, or $\frac{1}{10}$ the diameter of the sense side cavity 120. While the reference side cavity 150 is shown in FIGS. 2 and 3 as a cylindrical hole, the reference side cavity 150 can have any other shape and be formed by any other technique known in the art with the aid of this disclosure, so long as the end 152 of the reference side cavity 150 opens to the back side 144 of the sense die 143 and the opposite end 153 of the reference side cavity 150 opens to the second side 114 of the housing 110.

The sense side cavity 120 and the reference side cavity 150 are generally separated by the sense die assembly 140, The front side 142 of the sense die 143 can be exposed to the sense side cavity 120, and the back side 144 of the sense die assembly 140 can he exposed to the reference side cavity 150. Additionally, the front side 142 of the sense die 143 can be exposed to oil in the sense side cavity 120, and the back side 144 of the sense die assembly 140 exposed to oil in the reference side cavity 150.

The fill channel 180 can extend between the sense side cavity 120 and the second side 114 of the housing 110. The fill channel 180 is shown in FIG. 2 (as well as FIG. 3) as extending parallel to the reference side cavity 150. The fill channel 180 has an end 182 opening to the sense side cavity 120 and an opposite end 183 opening to the second side 114 of the housing 110. The fill channel 180 in FIGS. 2 and 3 is shown as a hole formed by drilling the hole in the housing 110. While the fill channel 180 is shown in FIGS. 2 and 3 as a cylindrical hole, the fill channel 180 can have any other shape and be formed by any other technique known in the art with the aid of this disclosure, so long as the end 182 of the fill channel 180 opens to the sense side cavity 120 and the opposite end 183 of the fill channel 180 opens to the second side 114 of the housing 110.

A seal 190 can be placed over the fill channel 180 on the second side 114 of the housing 110. In the figures, the seal 190 is a ball seal welded to the second side 114 of the housing 110 over the fill channel 180. The material of the bail seal can be stainless steel. It is contemplated that other seal configurations and attachment techniques known in the art can be used to seal the oil in the fill channel 180.

In an additional aspect, the housing 110 can include a second fill channel and a second seal (not shown). The second fill channel can have an end in fluid communication with the reference side cavity 150 and an opposite end opening to a side of the housing 114 (e.g., the second side 114 or a side of the housing 110 perpendicular to the second side 114). The second fill channel can be used to fill the reference side cavity 150 with oil, in configurations where the reference side diaphragm 160 or 260 is attached to the housing 110 before the reference side cavity 150 is filled with oil. The second seal can be placed over the opposite end of the second fill channel and attached thereto via similar techniques disclosed for seal 190.

The sense side diaphragm 130 can be seen attached to the first side 112 of the housing on the sensing side 102 of the sensor 100 and extending over the sense side cavity 120 so as to enclose the sense side cavity 120. The sense side diaphragm 130 can have one or more convolutions formed thereon. FIG. 1, FIG. 2, and FIG. 3 show the sense side diaphragm 130 can have eight convolutions; however, the number of convolutions can be more or less, including zero. The convolutions can be concentric circles as shown in FIG. 1. The convolutions can modify how the sense side diaphragm 130 deflects with thermal expansion and contraction of the oil filled and sealed into the sense side cavity 120. The sense side diaphragm 130 can be made of any material suitable for a particular application, such as a metal (e.g., 316 stainless steel) or media resistant and durable polymer (e.g., polyethylene or polypropylene), The sense die assembly 140 can include any configuration known for sensing pressure in the oil-filled configuration of sense side cavity 120 disclosed herein. The sense die assembly 140 can be placed in the sense side cavity 120, and in FIG. 2 and FIG. 3, the sense die assembly 140 can be seen as attached to one of the walls 211 which forms the sense side cavity 120.

The sense die assembly 140 can include a sense die 143, a substrate 145, a die attach 147, and one or more sensing elements 149.

The figures show the sense die 143 can be a slab die which has a uniform thickness. Alternatively, the sense die 143 can include a cavity and diaphragm formed by standard MEMS (Micro-Electro-Mechanical Systems) processing techniques such as deep reactive ion etching (DRIE) or KOH etching. The material of construction can be silicon, and the sense die 143 can be formed from one or a stack of silicon wafers.

The one or more sensing elements 149 can be included on the front side 142 of the sense die 143. The sensing elements 149 can be one or more piezoresistive elements or components, and/or other circuitry (e.g., trim circuitry, signal conditioning circuitry, etc,) formed using suitable fabrication or printing techniques. The sensing elements 149 (e.g., piezoresistive elements) can be configured to have an electrical resistance that varies according to an applied mechanical force in the direction of arrow B. In some cases, the sensing elements 149 can be formed of a silicon piezoresistive material. Alternatively, the sensing elements 149 can be any other suitable sensing elements formed of any suitable material, silicon or non-silicon based. Sensing elements 149 can be connected in a Wheatstone bridge configuration (e.g., a full or half bridge configuration). Generally, the one or more sensing elements 149 can sense a deflection of at least a portion of the sense die 143 in response to an applied pressure from the oil in the sense side cavity 120.

The back side 144 of the sense die 143 can be attached to the substrate 145 via any technique known in the art, such as adhesive, anodic bonding, frit bonding, silicon fusion bonding, solder, or a combination thereof. Any suitable conductive or nonconductive adhesive can be used. A non-limiting example of a conductive adhesive is SDC5000, which is available from Momentive Performance Materials Inc. of Waterford, N.Y. A nonlimiting example of a nonconductive adhesive is RTV6445, which is available from Momentive Performance Materials Inc. of Waterford, N.Y. Wire bonds can electrically connect the sense die 143 to the pins 170. The wire bonds can include any electrically conductive metal, such as gold or copper; however, any suitable material may be used, such as conductive polymers.

The substrate 145 can be any surface o which the sense die 143 can be mounted and which can be mounted to the housing 110. The substrate 145 may include ceramic material (e.g., alumina), which may have similar temperature expansion coefficients. Alternatively, the substrate 145 can include any other suitable materials (e.g., a printed circuit board (PCB)). In another aspect, the substrate 145 can be a constraint which is used for stress relief utilizing well-known wafer bonding techniques, such as, for example, anodic bonding and/or glass frit bonding. The constraint can be made of a material, such as silicon or glass. Alternatively, other types of materials known in the art can be utilized for the substrate 145. In such aspects, the die attach 147 can be electrically connected to the pins 170 (e.g., via wire bonds or other technique).

The sense die assembly 140 can be attached to the housing 110 via the die attach 147. FIGS. 2 and 3 show the die attach 147 can attach the substrate 145 of the sense die assembly 140 to the housing 110. In alternative configurations, the sense die assembly 140 may not include a substrate, and the die attach 147 can attach the sense die 143 to the housing 110. The die attach 147 can be any conductive adhesive, any non-conductive adhesive, or a combination of any conductive adhesive and any non-conductive adhesive disclosed herein.

The reference side diaphragm 160 and 260 can transmit the atmospheric pressure to oil in the reference side cavity 150, which subsequently transmits atmospheric pressure to the back side 144 of the sense die 143. Moreover, the reference side diaphragms 160 and 260 can transmit any variation(s) in the atmospheric pressure to the oil in the reference side cavity 150 (which transmits the variation(s) to the back side 144 of the sense die 143). In an aspect, the reference side diaphragm 160 or 260 can have a diameter which is less than or substantially less than a diameter of the sense side diaphragm 130. "Substantially less than" in this context can mean the diameter of the reference side diaphragm 160 or 260 can be less than ½, ⅓, ¼, ⅕, ⅙, ⅐, ⅛, ⅑, or ⅒ the diameter of the sense side diaphragm 130.

The reference side diaphragm 160 or 260 can include one or more convolutions in a concentric circle configuration similar to that of the sense side diaphragm 130. Alternatively, the reference side diaphragm 160 or 260 has no convolutions.

The reference side diaphragm 160 or 260 can be made of any material suitable for sealing the reference side cavity 150 with oil and having the sensitivity to deflect in response to variation(s) in the atmospheric pressure so as to provide a reference side pressure which is equal to the atmospheric pressure of the atmosphere where the pressure sensor 100 is located. Examples of such materials include but are not limited to a metal (e.g., a 316 stainless steel) or a polymer (e.g., polyethylene or polypropylene).

The reference side diaphragm 160 of FIG. 2 can be attached to the second side 114 of the housing 110 and over the reference side cavity 150. In FIG. 2, the reference side diaphragm 160 is attached to the recessed surface 116 of the second side 114. The reference side diaphragm 160 can be attached to the second side 114 via at least one projection weld or other welding or bonding technique.

A weld ring 168 can be used to attach the reference side diaphragm 160 to the second side 114 of the housing 110. In some aspects, the weld ring 168 can be used to attach the reference side diaphragm 260 of FIG. 3 to the second side 114 of the housing 110.

The reference side diaphragm 160 of FIG. 2 can include a lip portion 162 and a deflecting portion 164. The lip portion 162 can be the periphery of the reference side diaphragm 160 which is attached to the second side 114 of the housing 110. The lip portion 162 can surround the deflecting portion 164. The weld ring 168, when used, can be used on the lip portion 162. The deflecting portion 164 can be contoured, for example, with a dome shape or with one or more convolutions. A space 166 can thus be formed between the second side 114 of the housing 110 and the deflecting portion 164 of the reference side diaphragm 160 by the contour (e.g., the dome shape) of the deflecting portion 164. The space 166 prevents deflecting portion 164 of the reference side diaphragm 160 from bottoming out against (or contacting) the second side 114 of the housing 110.

Alternatively configured, reference side diaphragm 260 shown in FIG. 3 can be flat. The reference side diaphragm 260 can be attached directly to the second side 114 of the housing 110 without a weld ring. The reference side diaphragm 260 can be positioned aver the recessed portion 250 and over the reference side cavity 150. In FIG. 3, the reference side diaphragm 260 is additionally attached to the recessed surface 116 of the second side 114; however, it is contemplated that the reference side diaphragm 260 can be attached to the second side 114 of the housing 110 which does not have a recessed surface 116. The reference side diaphragm 260 can be attached to the second side 114 via at least one projection weld. The recessed portion 250 has a depth such that a space 266 exists between a wall 251 and/or 252 of the recessed portion 250 and the reference side diaphragm 260. The space 266 prevents the reference side diaphragm 260 from bottoming out against (or contacting) the recessed portion 250 of the housing 110.

Three of the six pins 170 can be seen in the cross-section view of FIGS. 2 and 3 extending downwardly from the recessed surface 116.

Although not shown in the figures for clarity, the pins 170 extend within the housing 110 near or into the sense side cavity 120 such that the pins 170 are electrically connected to the sense die assembly 140 within the housing 110 by electrical connection techniques known in the art (e.g., wire bonds which connect each of the pins 170 to appropriate bond pads on the front side 142 of the sense die 143). The pins 170 can additionally extend outside the housing 110 from the second side 114 thereof.

The pins 170 can be in any number suitable for gauge pressure sensors. For example, in an alternative to the configuration shown in the figures, the pins 170 can extend outside the housing 110 in an insulated ribbon cable or insulated strip cable. In some aspects, four pins 170 can be present in the pressure sensor 100, e.g., a +IN pin, –IN pin, +OUT pin, and –OUT pin.

The filler element 192 can be placed within the sense side cavity 120 to occupy volume in the sense side cavity 120 and to minimize the amount of oil in the sense side cavity 120. While one filler element 192 is shown in FIG. 2 (as well as in FIG. 3), the disclosure is not limited to requiring a filler element 192 in the pressure sensor 100, nor is the disclosure limited to requiring only one filler element 192. In some cases, the pressure sensor 100 can have one, two, three, four, or more filler elements 192. The filler element(s) 192, when utilized, can be formed of a solid material which is not compressible under the pressures subjected to the pressure sensor 100, e.g., ceramic material, polymer (e.g., polyethylene or polypropylene) material, metal material, composite material, etc. The filler element(s) 192 can be bonded to one or more of the walls 211, 212, 213, 214, 215, and 216 of the sense side cavity 120 of the housing 110 via an adhesive or epoxy, such as a non-conductive adhesive disclosed herein.

The filler elements 192 in FIGS. 2 and 3 are shown in varying shapes, and the disclosure is not limited to those shapes shown in FIGS. 2 and 3.

The sense side cavity 120 and the reference side cavity 150 are filled with oil. The oil can be any oil known in the art used for pressure sensors, such as silicone oil.

Oil can be filled in the sense side cavity 120 via the fill channel 180; thus, the sense side cavity 120 and the fill channel 180 can be filled with the same oil. Oil can be filled in the reference side cavity 150 via end 153 of the reference side cavity 150, In some aspects, the oil in the sense side cavity 120 can be the same as or different than the oil in the reference side cavity 150.

The oil in the sense side cavity 120 and fill channel 180 can be sealed in the housing 110 by the sense side diaphragm 130, the sense die assembly 140, the walls 211, 212, 213, 214, 215, and 216 of the sense side cavity 120, the wall 181 of the fill channel 180, and the seal 190. The oil in the reference side cavity 150 can be sealed in the housing 110 by the sense die assembly 140, the wall 151 of the reference side cavity 150, and the reference side diaphragm 160.

Figure 4:
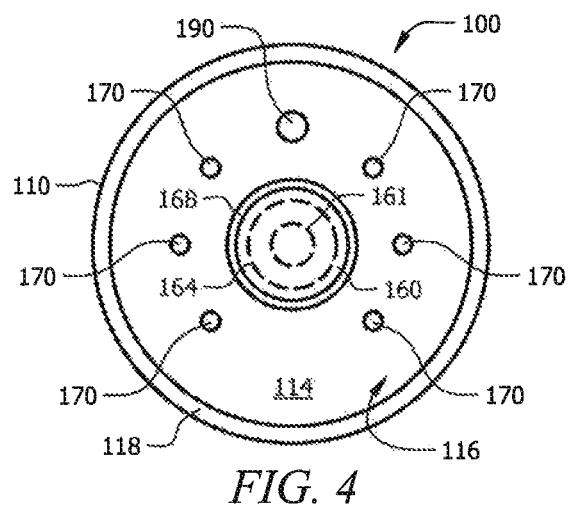
FIG. 4 is a view of the back side of the pressure sensor having the reference side diaphragm of FIG. 2.

FIG. 4 is a view of the back side 104 of the pressure sensor 100 having the reference side diaphragm 160 of FIG. 2. Six pins 170 can be seen in the pressure sensor 100. The six pins 170 are shown as equally spaced around the reference side diaphragm 160. The reference side diaphragm 160 is shown having a circular shape in FIG. 2; however, it is contemplated the reference side diaphragm 160 can alternatively or additionally include any other shape, for example, square, hexagonal, and so on. Likewise, the weld ring 168 is shown as having a circular shape; however, it is contemplated the weld ring 168 can be the same shape as the reference side diaphragm 160, whatever the shape may be. Contour lines 161 of the reference side diaphragm 160 show the dome-contour of the deflecting portion 164 of the reference side diaphragm 160. It can be seen that the recessed surface 116 of the second side 114 creates a non-recessed portion 118 along a periphery of the second side 114.

Figure 5:
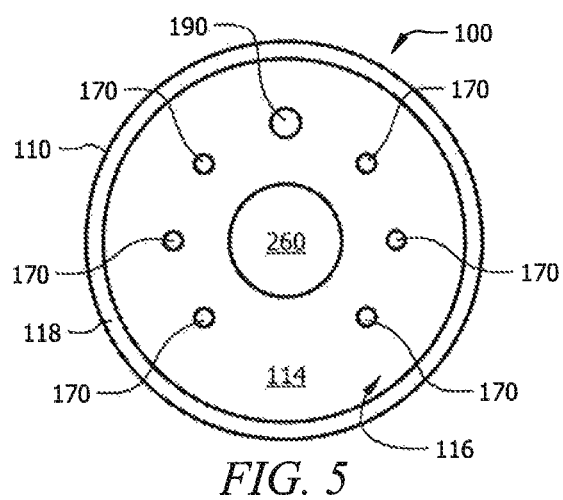
FIG. 5 is a view of the back side of the pressure sensor having the reference side diaphragm of FIG. 3.

FIG. 5 is a view of the back side 104 of the pressure sensor 100 having the reference side diaphragm 260 of FIG. 3. Six pins 170 can be seen in the pressure sensor 100. The six pins 170 are shown as equally spaced around the reference side diaphragm 260. No weld ring is seen in FIG. 5. Moreover, the reference side diaphragm 260 does not have contour lines, because the reference side diaphragm 260 is flat. It can be seen that the recessed surface 116 of the second side 114 creates a non-recessed portion 118 along a periphery of the second side 114.

In operation, when a pressure is applied to the sense side diaphragm 130 in the direction of arrow B, the sense side diaphragm 130 can deflect, causing compression of the oil in the sense side cavity 120, The oil, acting as an incompressible fluid, transmits the pressure to the sense die 143. When a current is applied to the sensing elements 149 (e.g., a Wheatstone bridge configuration of piezoresistive elements), an electrical output signal may be generated that is related to a degree of deflection of the sensing elements 149 and sense die 143 caused by the pressure exerted on the sense die assembly 140 by the oil in the sense side cavity 120.

Thus, a method for operating the pressure sensor 100 can include one or More of i) applying a current to one or more sensing elements 149, ii) receiving an external pressure against the sense side diaphragm 130, iii) transmitting the pressure from the sense side diaphragm 130 to the oil in the sense side cavity 120, iv) transmitting the pressure from the oil in the sense side cavity 120 to the sense die 143, v) deflecting the sense die 143 in response to the transmitted pressure, and v) outputting an electrical signal from the one or more sensing elements 149.

Also disclosed herein is a method of manufacturing the pressure sensor 100. The method can include mounting the sense die assembly 140 onto the housing 110 such that the front side 142 of the sense die 143 is exposed to the sense side cavity 120 formed in the first side 112 of the housing 110, and a back side 144 of the sense die 143 is exposed to a reference side cavity 150 formed in a second side 114 of the housing 110 and such that the sense die assembly 140 is electrically connected to one or more pins 170 which extend outside the housing 110 from the second side 114; attaching the sense side diaphragm 130 to the first side 112 of the housing 110; filling the sense side cavity 120 and the reference side cavity 150 with oil; and attaching the reference side diaphragm 160 or 260 on the second side 114 of the housing 110 and over the reference side cavity 150.

The method can further include attaching (e.g., projection welding or other welding or bonding technique known in the art with the aid of this disclosure) the seal 190 on the second side 114 of the housing 110 and over the fill channel 180 which extends between the sense side cavity 120 and the second side 114 of the housing 110. The seal 190 can be welded to the end 183 of the fill channel 180 which opens to the second side 114 of the housing 110 and is opposite the sense side cavity 120.

Attaching the sense side diaphragm 130 to the first side 112 of the housing 110 can include projection welding or other welding or bonding technique known in the art with the aid of this disclosure. Additionally or alternatively, attaching the reference side diaphragm 160 or 260 to the second side 114 of the housing 110 can include projection welding or other welding or bonding technique known in the art with the aid of this disclosure.

The step of attaching the reference side diaphragm 160 or 260 and the step of attaching the seal 190 can be performed simultaneously or in series during a projection single phase of manufacturing the pressure sensor 100 (e.g., a welding phase). Additionally, the step of attaching the sense side diaphragm 130 and the attaching the reference side diaphragm 160 or 260 can be performed simultaneously or in series during a single phase (e.g., a welding phase) of manufacturing the pressure sensor 100. Additionally, the step of attaching the sense side diaphragm 130 and the step of attaching the seal 190 can be performed simultaneously or in series during a single phase (e.g., a welding phase) of manufacturing the pressure sensor 100.

Welding (by any welding technique disclosed herein or known in the art with the aid of the disclosure) of any of the sense side diaphragm 130, the reference side diaphragms 160 and 260, and the seal 190 can be performed while parts of the pressure sensor 100 are submerged in. the oil.

Filling the sense side cavity 120 and the reference side cavity 150 with oil can occur under a vacuum. Additionally, the oil used to fill the sense side cavity 120 and the reference side cavity 150 can be pre-evacuated to remove any air (i.e., air is removed from the oil prior to filling any of the sense side cavity 120 and reference cavity 150).

In some aspects, filling the sense side cavity 120 and the reference side cavity 150 with oil can occur after the reference side diaphragm 160 or 260 and the sense side diaphragm 130 are attached to the housing 114, In such aspects, oil can be filled through the fill channel 180 to fill the sense side cavity 120 and through a second fill channel (configured as described hereinabove) to fill the reference side cavity 150. In such aspects, the method can additionally include attaching (e.g., projection welding or other welding or bonding technique known in the art with the aid of this disclosure) a second seal to the housing 110 to seal oil in the second fill channel (and thus the reference side cavity 150). In such aspects, other welding or bonding techniques can be used to attach the reference side diaphragm 160 to the second side 114 (and optionally the sense side diaphragm 130), in alternative to projection welding.

The method can further include using a weld ring 168 to attach the reference side diaphragm 160 of FIG. 2 to the second side 114 of the housing 110.

The method can further include forming the recessed portion 250 on the second side 114 of the housing 110 (as shown in FIG. 3), and placing the reference side diaphragm 260 over the reference side cavity 150. The reference side diaphragm 260 can extend over the recessed portion 250 such that a space 266 is present between the recessed portion 250 and the reference side diaphragm 260.

The method can further include placing one or more of the filler elements 192 in the sense side cavity 120 before filling the sense side cavity 120 and the reference side cavity 150 with oil.

The method can additionally include, or alternatively a method of operating the pressure sensor 100 can include, transmitting a media pressure (e.g., in the direction of arrow B) from the sense side diaphragm 130 to the oil in the sense side cavity 120, transmitting the media pressure from the oil in the sense side cavity 120 to the sense die assembly 140, and sending electrical signals from one or more sensing elements 149 of the sense die assembly 140 to at least one of the one or more pins 170.

As discussed previously, the pressure sensor 100 disclosed herein is configured to sense a pressure only on the sensing side 102 via exposure to one or more media, while the back side 104 is not exposed to media and is instead exposed to the atmosphere. Because the pressure sensor 100 and methods disclosed herein are for gauge (gage) pressure sensing with an atmospheric pressure reference-side pressure (thus utilizing gauge pressure components), the design of the pressure sensor 100 with the reference side diaphragm 160 or 260 is simplified and more cost-effective when compared to differential pressure sensors.

As also discussed herein, the disclosed configurations include a reference side diaphragm 160 or 260 and seal 190 which are welded onto the second side 114 of the housing 110 either simultaneously or in series, e.g., in the same attaching step or in adjacent or consecutive attaching steps. Such a technique can achieve a convenient, simple, reliable, and cost-effective technique for implementing the reference side diaphragm 160 or 260 configurations disclosed herein.

The use of the reference side diaphragm 160 or 260 of disclosed gauge pressure sensor configurations to isolate the sense die assembly 140 from the atmosphere can reduce or prevent environmentally induced changes in the die attach 147 and reduce or prevent humidity or air penetration into the oil-filled sense side cavity 120. Moreover, because the sense die assembly 140 can be isolated from the atmosphere with oil in the reference side cavity 150, use of a far greater range of die attach materials, some of which may be sensitive or prone to air penetration and humidity in the atmosphere (thus previously making their use impractical), is enabled.

Reduction or prevention of humidity effects and air penetration can reduce or prevent drift quality issues, allow for a tighter total error band (TEB), allow for tighter drift specifications, and allow for use of a wider range of die attach materials. Thus, use of the reference side diaphragm 160 or 260 in the configurations disclosed for the gauge pressure sensor 100 can reduce or prevent drift quality issues, allow for a tighter total error band (FEB), allow for tighter drift specifications, and allow greater freedom in selection of die attach materials in the pressure sensor 100 when compared to an otherwise similar gauge pressure sensor which does not have the reference side diaphragm 160 or 260.

The configurations having the reference side diaphragm 160 or 260 disclosed herein can also sense ultra-low pressures on the sensing side 102 of the pressure sensor 100. "Ultra-low pressure (ULP)" or "ultra-low pressure range(s)" refer to gauge pressure(s) in a range of about 2.5 mbarg to 40 mbarg; 1 inH$_2$Og to 16 inH$_2$Og; 0.36 psig to 0.58 psig; 0.25 kPag to 4 kPag. As a result, the pressure sensor 100 configurations disclosed herein can include materials of construction for the housing 110, the sense side diaphragm 130, and the reference side diaphragm 160 or 260 which are suitable for ULP range operation but which may be unsuitable for higher pressure ranges. Of course, the disclosed pressure sensor 100 additionally or alternatively can be configured to sense pressures above the ultra-low pressure range, for example, in a range of 0 psig to about 10,000 psig (0 mbar to about 689 bar; 0 inH$_2$O to about 277,000 inH$_2$O; 0 kPa to about 68.9 MPa).

Having described various configurations and Methods herein, a number of aspects can include, but are not limited to:

Aspect 1 is a pressure sensor comprising a housing having a sense side cavity formed on a first side of the housing; a sense side diaphragm attached to the first side of the housing and over the sense side cavity; a sense die assembly placed in the sense side cavity and attached to the housing, wherein the sense die assembly comprises a sense die having a front side exposed to at least a portion of the sense side cavity; a reference side cavity formed in the housing, wherein a back side of the sense die of the sense die assembly is exposed to the reference side cavity; a reference side diaphragm attached to a second side of the housing and over the reference side cavity; and one or more pins electrically connected to the sense die assembly and extending outside the housing from the second side, wherein the sense side cavity and the reference side cavity are filled with oil.

Aspect 2. The pressure sensor of Aspect 1, further comprising a fill channel extending between the sense side cavity and the second side of the housing.

Aspect 3. The pressure sensor of Aspect 2, further comprising a seal placed over the fill channel on the second side of the housing.

Aspect 4. The pressure sensor of Aspect 3, wherein the seal is a ball seal welded to the second side of the housing over the fill channel.

Aspect 5. The pressure sensor of any of Aspects 1 to 4, wherein the reference side diaphragm has a diameter which is less than or substantially less than a diameter of the sense side diaphragm.

Aspect 6. The pressure sensor of any of Aspects 1 to 5, wherein the reference side cavity has a diameter which is less than or substantially less than a diameter of the sense side diaphragm.

Aspect 7. The pressure sensor of any of Aspects 1 to 6, wherein the reference side diaphragm is attached to the second side via at least one projection weld.

Aspect 8. The pressure sensor of any of Aspects 1 to 7, wherein a weld ring is used to attach the reference side diaphragm to the second side.

Aspect 9. The pressure sensor of any of Aspects 1 to 8, wherein the reference side diaphragm comprises a lip portion and a deflecting portion, wherein the lip portion is attached to the second side of the housing, and wherein the deflecting portion has a contour such that a space is formed between the second side of the housing and the deflecting portion.

Aspect 10. The pressure sensor of any of Aspects 1 to 9, wherein the second side of the housing has a recessed portion, wherein the reference side diaphragm extends over the recessed portion such that a space is present between the recessed portion and the reference side diaphragm.

Aspect 11. The pressure sensor of any of Aspects 1 to 10, the sense die assembly further comprising a die attach which attaches the sense die assembly to the housing.

Aspect 12. The pressure sensor of Aspect 11, wherein the die attach comprises a conductive or non-conductive adhesive.

Aspect 13. The pressure sensor of any of Aspects 1 to 12, further comprising a second fill channel and a second seal. The second fill channel can have an end in fluid communication with the reference side cavity and an opposite end opening to a side of the housing (e.g., the second side or a side of the housing perpendicular to the second side). The second seal can be placed over the opposite end of the second fill channel and attached thereto via similar techniques disclosed for seals.

Aspect 14. A method of manufacturing a pressure sensor, the method comprising mounting a sense die assembly onto a housing such that a front side of a sense die of the sense die assembly is exposed to a sense side cavity formed in a first side of the housing and a back side of the sense die of the sense die assembly is exposed to a reference side cavity formed in a second side of the housing and such that the sense die assembly is electrically connected to one or more pins which extend outside the housing from the second side; attaching a sense side diaphragm to the first side of the housing; filling the sense side cavity and the reference side cavity with oil; and attaching a reference side diaphragm on the second side of the housing and over the reference side cavity.

Aspect 15. The method of Aspect 14, further comprising attaching a seal on the second side of the housing and over a fill channel which extends between the sense side cavity and the second side of the housing.

Aspect 16. The method of Aspect 15, wherein the step of attaching the reference side diaphragm and the step of attaching the seal are performed simultaneously or in series during a single phase of manufacturing the pressure sensor.

Aspect 17. The method of Aspect 15 or 16, wherein the seal is a ball seal.

Aspect 18. The method of any of Aspects 14 to 17, further comprising using a weld ring to attach the reference side diaphragm to the second side of the housing.

Aspect 19. The method of any of Aspects 14 to 18, wherein the reference side diaphragm comprises a lip portion and a deflecting portion, wherein the lip portion is attached to the second side of the housing, and wherein the deflecting portion has a contour such that a space is formed between the second side of the housing and the deflecting portion.

Aspect 20. The method of any of Aspects 14 to 19, further comprising forming a recessed portion on the second side of the housing, wherein the reference side diaphragm extends over the recessed portion such that a space is present between the recessed portion and the reference side diaphragm.

Aspect 21. The method of any of Aspects 14 to 20, wherein the sense die assembly is mounted to the housing with a die attach comprising a conductive or non-conductive adhesive.

Aspect 22. The method of any of Aspects 14 to 21, further comprising placing one or more of the filler elements in the sense side cavity before filling the sense side cavity and the reference side cavity with oil.

Aspect 23. The method of any of Aspects 14 to 22, wherein oil can be filled through the fill channel to fill the sense side cavity and through a second fill channel (configured as described hereinabove) to fill the reference side cavity.

Aspect 24. The method of Aspect 23, further comprising attaching (e.g., projection welding or other welding or bonding technique known in the art with the aid of this disclosure) a second seal to the housing to seal oil in the second fill channel. In such aspects, other welding or bonding techniques can be used to attach the reference side diaphragm to the second side (and optionally the sense side diaphragm), in alternative to projection welding.

While several aspects have been provided in the present disclosure, it should be understood that the disclosed pressure sensors and methods may be embodied in many other specific forms without departing from the spirit or scope of the present disclosure. The present examples are to be considered as illustrative and not restrictive, and the intention is not to be limited to the details given herein, For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A pressure sensor comprising:
   a housing having a sense side cavity formed on a first side of the housing;
   a sense side diaphragm attached to the first side of the housing and over the sense side cavity, wherein the sense side diaphragm has a first surface area exposed to the sense side cavity;
   a sense die assembly placed in the sense side cavity and attached to the housing, wherein the sense die assembly comprises a sense die having a front side exposed to at least a portion of the sense side cavity;
   a reference side cavity formed in the housing, wherein a back side of the sense die of the sense die assembly is exposed to the reference side cavity;
   a reference side diaphragm attached to a second side of the housing and over the reference side cavity, wherein the reference side diaphragm has a second surface area exposed to the reference side cavity that is less than one-half that of the first surface area, and wherein the reference side diaphragm deflects in response to variation(s) in atmospheric pressure so as to provide a reference side pressure to the reference side cavity;
   one or more pins each spaced laterally outside a perimeter of the reference side diaphragm but inside a perimeter of the sense side diaphragm, the one or more pins electrically connected to the sense die assembly and extending outside the housing from the second side; and
   wherein the sense side cavity and the reference side cavity are filled with oil.

2. The pressure sensor of claim 1, further comprising:
   a fill channel extending between the sense side cavity and the second side of the housing.

3. The pressure sensor of claim 2, further comprising:
   a seal placed over the fill channel on the second side of the housing.

4. The pressure sensor of claim 3, wherein the seal is a ball seal welded to the second side of the housing over the fill channel.

5. The pressure sensor of claim 1, wherein the sense side diaphragm has a circular shape and the reference side diaphragm has a circular shape, wherein a diameter of the reference side diaphragm is less than one-half that of a diameter of the sense side diaphragm.

6. The pressure sensor of claim 1, wherein the reference side diaphragm is attached to the second side of the housing via at least one projection weld.

7. The pressure sensor of claim 1, wherein a weld ring is used to attach the reference side diaphragm to the second side of the housing.

8. The pressure sensor of claim 1, the sense die assembly further comprising:

a die attach which attaches the sense die assembly to the housing.

9. The pressure sensor of claim 8, wherein the die attach comprises a conductive or non-conductive adhesive.

10. The pressure sensor of claim 1, wherein:
the reference side diaphragm comprises a lip portion and a deflecting portion, wherein the lip portion is attached to the second side of the housing, and wherein the deflecting portion has a contour such that a space is formed between the second side of the housing and the deflecting portion.

11. A pressure sensor comprising:
a housing having a sense side cavity formed on a first side of the housing;
a sense side diaphragm attached to the first side of the housing and over the sense side cavity, the sense side diaphragm having a first surface area exposed to the sense side cavity;
a sense die assembly placed in the sense side cavity and attached to the housing, wherein the sense die assembly comprises a sense die having a front side exposed to at least a portion of the sense side cavity;
a reference side cavity formed in the housing, wherein a back side of the sense die of the sense die assembly is exposed to the reference side cavity;
a reference side diaphragm attached to a second side of the housing and over the reference side cavity, wherein the reference side diaphragm has a second surface area exposed to the reference side cavity that is less than one-half that of the first surface area;
one or more pins each spaced laterally outside a perimeter of the reference side diaphragm but inside a perimeter of the sense side diaphragm, the one or more pins electrically connected to the sense die assembly and extending outside the housing from the second side and
wherein the sense side cavity and the reference side cavity are filled with oil.

12. A method of manufacturing a pressure sensor, the method comprising:
mounting a sense die assembly onto a housing such that a front side of a sense die of the sense die assembly is exposed to a sense side cavity formed in a first side of the housing and a back side of the sense die of the sense die assembly is exposed to a reference side cavity formed in a second side of the housing and such that the sense die assembly is electrically connected to one or more pins which extend outside the housing;
filling the sense side cavity and the reference side cavity with oil by submerging the assembly in an oil bath;
welding a sense side diaphragm to the first side of the housing while submerged in the oil bath, the sense side diaphragm having a first surface area exposed to the sense side cavity;
welding a reference side diaphragm on the second side of the housing and over the reference side cavity while submerged in the oil bath, wherein the reference side diaphragm has a second surface area exposed to the reference side cavity that is less than one-half that of the first surface area, and wherein the reference side diaphragm deflects in response to variation(s) in atmospheric pressure so as to apply an atmospheric pressure to the reference side cavity and thus the back side of the sense die of the sense die assembly; and
wherein the step of welding the sense side diaphragm and the step of welding the reference side diaphragm are performed simultaneously while submerged in the oil bath.

13. The method of claim 12, further comprising:
attaching a seal on the second side of the housing and over a fill channel which extends between the sense side cavity and the second side of the housing while submerged in the oil bath.

14. The method of claim 13, wherein the step of attaching the reference side diaphragm and the step of attaching the seal are performed simultaneously or in series during a single phase of manufacturing the pressure sensor.

15. The method of claim 13, wherein the seal is a ball seal.

16. The method of claim 12, further comprising:
using a weld ring to attach the reference side diaphragm to the second side of the housing.

17. The method of claim 12, further comprising:
forming a recessed portion on the second side of the housing, wherein the reference side diaphragm extends over the recessed portion such that a space is present between the recessed portion and the reference side diaphragm.

18. The method of claim 12, wherein the sense die assembly is mounted to the housing with a die attach comprising a conductive or non-conductive adhesive.

19. The method of claim 12, further comprising:
placing one or more filler elements in the sense side cavity before filling the sense side cavity with oil.

20. The method of claim 12, wherein the reference side diaphragm comprises a lip portion and a deflecting portion, wherein the lip portion is attached to the second side of the housing, and wherein the deflecting portion has a contour such that a space is formed between the second side of the housing and the deflecting portion.

* * * * *